United States Patent
Brouwers

(10) Patent No.: US 12,232,669 B2
(45) Date of Patent: Feb. 25, 2025

(54) POOLING MITIGATION FOR AUTONOMOUS WET CLEANING ROBOT

(71) Applicant: BISSELL Inc., Grand Rapids, MI (US)

(72) Inventor: Andrew J. Brouwers, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 32 days.

(21) Appl. No.: 18/122,490

(22) Filed: Mar. 16, 2023

(65) Prior Publication Data

US 2023/0309775 A1      Oct. 5, 2023

Related U.S. Application Data

(60) Provisional application No. 63/325,382, filed on Mar. 30, 2022.

(51) Int. Cl.
*A47L 11/40* (2006.01)
*A47L 11/30* (2006.01)

(52) U.S. Cl.
CPC ......... *A47L 11/4011* (2013.01); *A47L 11/302* (2013.01); *A47L 11/4016* (2013.01); *A47L 11/4041* (2013.01); *A47L 11/4066* (2013.01); *A47L 11/4083* (2013.01); *A47L 11/4088* (2013.01); *A47L 2201/04* (2013.01); *A47L 2201/06* (2013.01)

(58) Field of Classification Search
None
See application file for complete search history.

(56) References Cited

U.S. PATENT DOCUMENTS

| | | | |
|---|---|---|---|
| 2007/0016328 A1* | 1/2007 | Ziegler | B60R 19/483 |
| | | | 318/609 |
| 2020/0073401 A1* | 3/2020 | Szatmary | G05D 1/0257 |
| 2020/0315421 A1* | 10/2020 | Kung | G08B 21/02 |
| 2020/0383547 A1* | 12/2020 | Sutter | A47L 11/4041 |

\* cited by examiner

*Primary Examiner* — Eric W Golightly
(74) *Attorney, Agent, or Firm* — Warner Norcross + Judd LLP

(57) ABSTRACT

A system and method for adjusting behavior of an autonomous wet surface cleaner to avoid, reduce, or remedy situations where too much cleaning fluid is left on the surface. During certain autonomous floor cleaner events excess cleaning fluid can pool beneath the cleaner. For example, a cleaning fluid pool can form as the cleaner slows or stops approaching an obstacle, becomes stuck in a location, or executes certain navigation routines, such as certain turning maneuvers or cleaning patterns. The cleaning fluid pooling can be mitigated by executing a cleaning fluid pooling mitigation strategy that prevents the cleaning fluid from pooling, reduces the amount of cleaning fluid that pools, or addresses the cleaning fluid pooling. The cleaning fluid pool mitigation strategies can include various adjustments to the drive system, dispenser system, recovery system, and other autonomous wet surface cleaner systems, and combinations thereof.

9 Claims, 10 Drawing Sheets

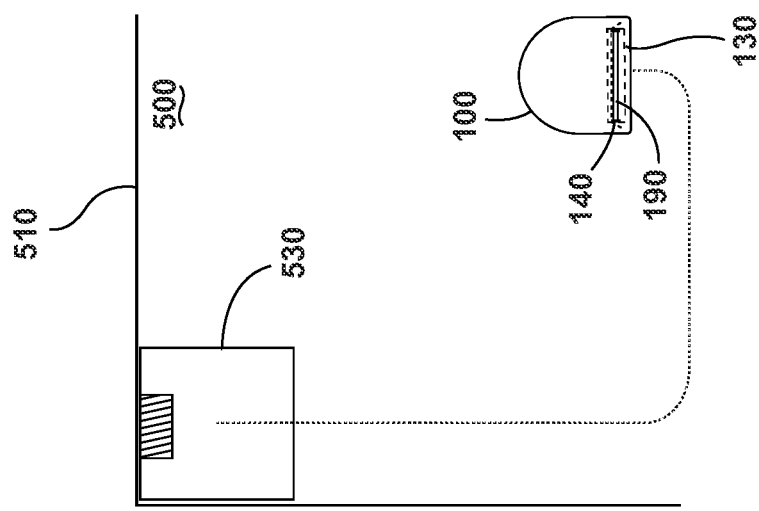
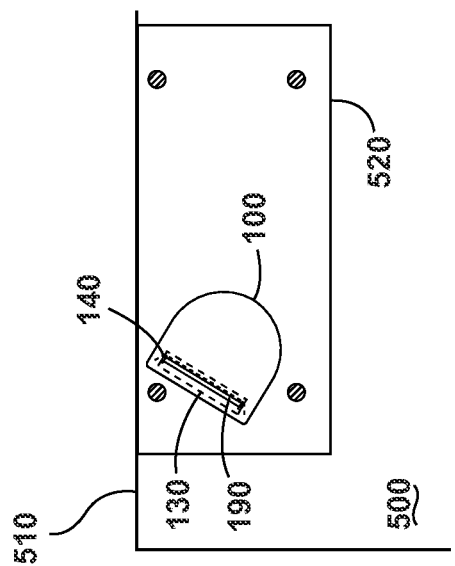
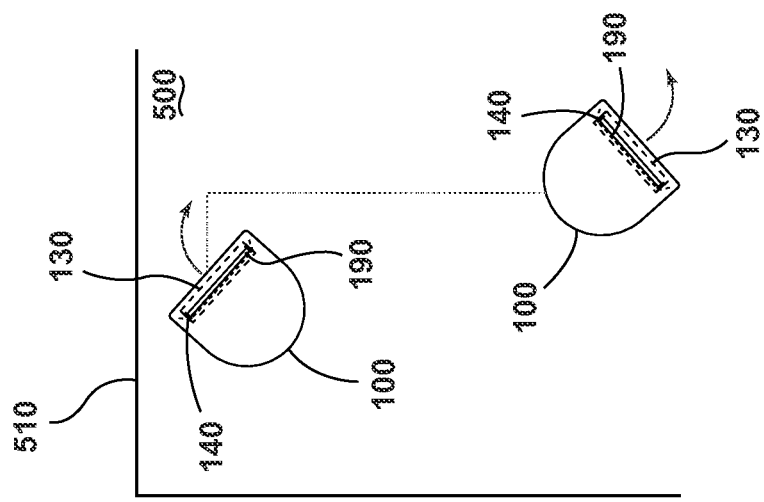

POOLING MITIGATION FOR AUTONOMOUS WET CLEANING ROBOT

BACKGROUND OF THE INVENTION

The present invention relates to autonomous wet surface cleaners. More specifically, the present invention relates to mitigating undesired pooling of fluid by autonomous wet surface cleaners.

Currently, most surface cleaners capable of wet cleaning are human operated upright surface cleaners that are not autonomous. These upright wet surface cleaners typically have a trigger that allows the operator to selectively dispense cleaning fluid, such as water or a mixture of water and one or more cleaning agents. The user can balance the amount of cleaning liquid dispensed with the speed and positioning of the surface cleaner using their judgement. If insufficient cleaning fluid is dispensed, the user can press the trigger down longer to dispense more. If too much cleaning fluid is dispensed, the user can repeatedly operate the device over that area to clean up the excess fluid. For example, with a vacuum surface cleaner, the operator may slowly and repeatedly reverse the movement of the wet vacuum over the patch of floor with excess fluid so the suction from the vacuum removes a suitable amount of excess fluid.

Autonomous wet robot floor cleaners and some upright wet floor cleaners do not have a human operated trigger for dispensing cleaning fluid. Instead, they are generally configured to automatically continuously output a small amount of cleaning fluid during operation. One issue with this approach is that it can lead to pools of cleaning fluid forming on the floor in some circumstances. For example, as a wet floor cleaner cleans a floor, the small, but continuous, amount of cleaning fluid dispensed onto the floor or onto cleaning pads to aid in wet cleaning the floor, but in some circumstances, such as the floor cleaner slowing down to prevent collision with an object or wall, the cleaning fluid can pool between the brush roller and squeegee. Where there is no operator with selective control of when and how much cleaning liquid to dispense it can be problematic for the surface cleaner to dispense sufficient cleaning fluid to wet clean efficiently and effectively without dispensing too much cleaning fluid, especially during various surface cleaner maneuvers. The resultant pooling can result in an undesirable finish on the floor, excessive drying times, or other issues. The pooling problem can be exacerbated for autonomous wet robot vacuums because there is no human operator to identify a pool of cleaning fluid has formed and reactively take remedial action.

Existing solutions to pooling issues essentially require judgment and execution by a wet surface cleaner operator, which is not suitable for autonomous applications and may not be sufficient for some upright wet surface cleaners. Therefore, there is a need to develop systems and methods for mitigating pooling, whether by reducing, remediating, or preventing the pooling caused by wet surface cleaners.

SUMMARY OF THE INVENTION

The present invention provides systems and methods for an autonomous wet floor cleaner to mitigate fluid pooling on the floor surface. By adjusting robot behavior according to a cleaning fluid pooling mitigation strategy in response to certain events, the autonomous floor cleaner can reduce, remediate, or prevent fluid pooling. For example, cleaning fluid can pool as a result of the autonomous floor cleaner slowing down or stopping due to identifying or encountering an obstacle, becoming stuck in a location, the robot stopping, traction issues or due to certain navigation routines, such as turning around or after a corn-row maneuver. The autonomous wet floor cleaner can be configured to identify certain autonomous wet floor cleaner instructions as cleaning fluid pooling precursor events and in response control one or more of the drive system, cleaning fluid dispenser system, and the recovery system to mitigate cleaning fluid pooling associated with the identified autonomous wet floor cleaner instruction using a fluid pooling mitigation strategy. Various fluid pooling mitigation strategies and systems for execution of them are disclosed including, but not limited to, reducing or stopping the cleaning fluid pump in response to certain autonomous floor cleaner events, reducing or stopping brushroll speed in response to certain autonomous floor cleaner events, reducing, stopping, or reversing drive speed in response to certain autonomous floor robot maneuvers, executing one or more specific robot maneuvers to improve distribution of cleaning fluid to an agitator or improve fluid extraction, or combinations thereof.

The present invention provides simple and effective fluid pooling mitigation strategies that can be executed by a variety of different autonomous wet floor cleaners. These fluid pooling mitigation strategies can provide one or more benefits including a reduction or prevention of excess liquid (clean or dirty) from being left behind on the floor surface, a reduction in drying time, a more consistent wet cleaning experience, cleaning fluid conservation, as well as other benefits or any combination thereof.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 5D is a similar top down representational view showing the autonomous wet cleaning robot responding to encountering an obstacle or performing a turn according to one aspect.

FIG. 5E is a similar top down representational view showing the autonomous wet cleaning robot becoming stuck according to one aspect.

FIG. 5F is a similar top down representational view showing the autonomous wet cleaning robot returning to a docking station according to one aspect.

DESCRIPTION OF THE CURRENT EMBODIMENT

Figure 1:
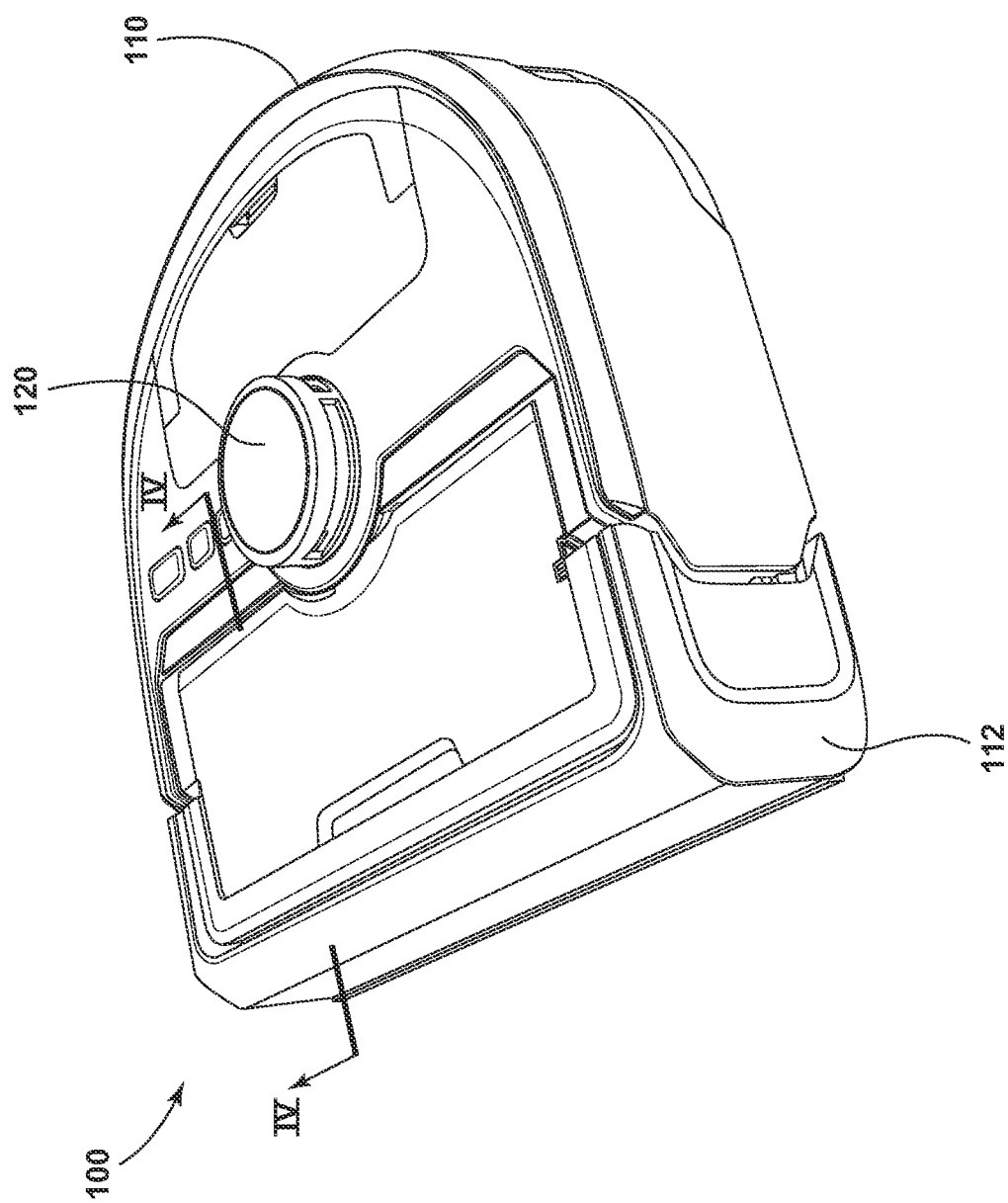
FIG. 1 is a perspective drawing of an autonomous wet cleaning robot according to one aspect.

Various systems and methods for mitigating fluid pooling resulting from operation of a wet floor cleaner are provided herein. In one embodiment, perhaps most easily understood with reference to the representational flow diagram of FIG. 3, an autonomous robot wet floor cleaner has a refillable reservoir 170 toward the back of the robot that can be filled with cleaning fluid. A pump 53 is configured to push the cleaning fluid along a cleaning fluid flow path 310 from the tank 170 into to a cleaning fluid distributor 172. In this one embodiment, the distributor 172 is a drip bar located above the brushroll 130. The cleaning fluid can be distributed across the microfiber brushroll 130 via a number of output holes in the drip bar. In general, as the autonomous robot wet floor cleaner moves in the forward direction, dispensed cleaning fluid can pool on the floor, typically between the brushroll 130 and squeegee 140 (i.e., the portion of the floor directly beneath the small gap between the squeegee 140 and the brushroll 130).

In general, the various embodiments of the present disclosure focus on cleaning fluid pooling mitigation. Cleaning fluid pooling mitigation can refer not only to reducing or preventing the cleaning fluid from pooling on the floor in the first place, but it can also refer to reducing, remediating, or recapturing some or all of the pooled cleaning fluid on the floor or to another fluid on the floor. That is, in addition to or instead of mitigating cleaning fluid dispensed by the robot, embodiments of the present disclosure can also mitigate other fluid on the floor. For example, cleaning fluid mitigation strategies can assist with not only excess cleaning fluid pooling, but other fluids pooling on the floor, such as spilled milk, soda pop, juice, or other liquids. As discussed in more detail below, some embodiments accomplish cleaning fluid pooling mitigation by injecting a small backward movement before the autonomous robot makes a navigation transition that may cause a cleaning fluid pooling event.

Figure 7:
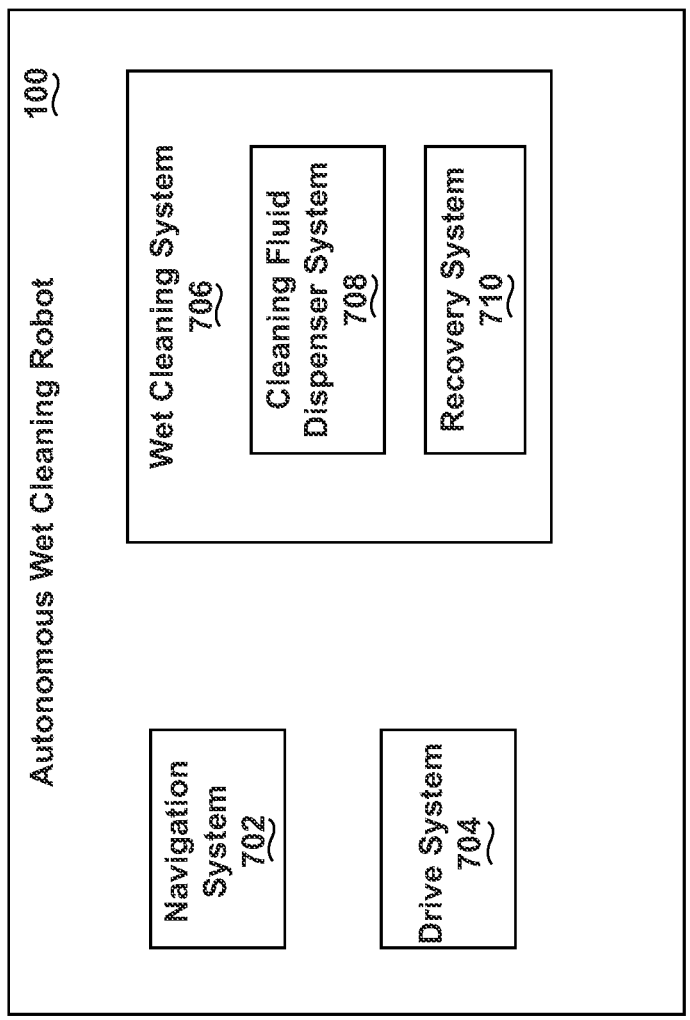
FIG. 7 is a high level system diagram according to one aspect.

FIG. 7 shows a high level system diagram for an exemplary autonomous wet cleaning robot 700 in accordance with one aspect of the present disclosure. The robot 700 can include a combination of systems configured to autonomously wet clean one or more surfaces of an environment. For example, as shown in FIG. 7 the robot 700 can include a navigation system 702 for sensing and making decisions based on information about the robot's environment, a drive system 704 for driving the robot about the environment based on information from the navigation system, and a wet cleaning system 706 for wet cleaning one or more surfaces in the environment. The wet cleaning system 706 of the current embodiment can include a cleaning fluid dispenser system 708 and a recovery system 710.

The robot 700 can include one or more controllers that can control (e.g., instruct) and/or receive inputs from the various systems. Any of the various robot systems can be in communication with one or more controllers utilizing essentially any suitable communication protocol. The various systems can include various components and subsystems. For example, the wet cleaning system 706 may include a cleaning fluid dispenser system 708 and recovery system 710. The one or more controllers can be in direct or indirect communication with the various system subsystems and individual components.

The various systems of the robot 100, 700 can be implemented with dedicated components, shared components, or a combination thereof. For example, each of the systems may have its own processor, memory, and other components configured to accomplish the system's functionality. One or more of the systems may share some or all of its components with one or more other systems. For example, in some embodiments, one overarching robot controller and shared memory work in conjunction to control functionality of the navigation system, drive system, the wet cleaning system, and other systems as will be described further in connection with the exemplary embodiment of FIGS. 8A-B.

Figure 8A:
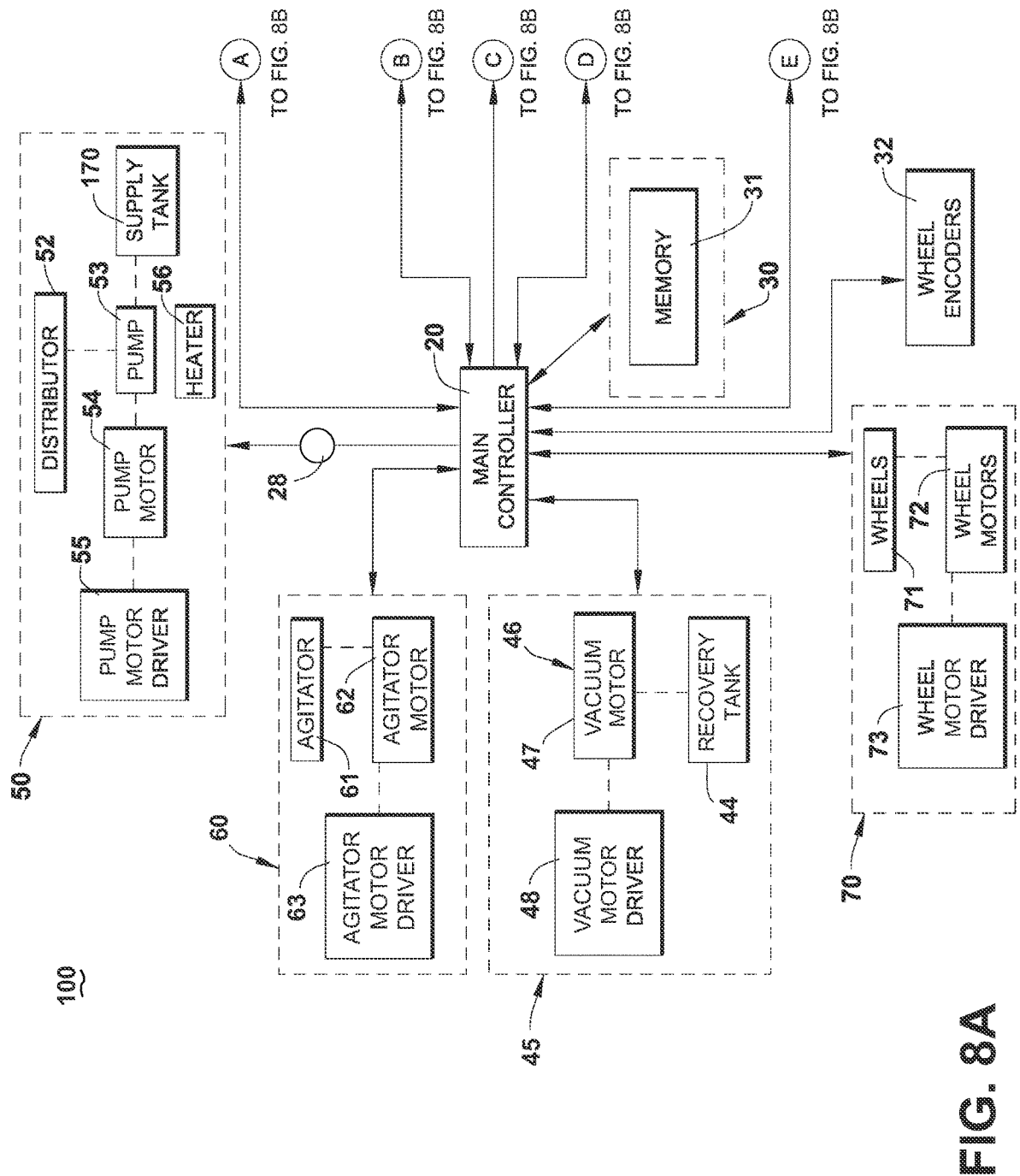
FIG. 8A is a schematic view of an exemplary autonomous floor cleaner illustrating functional systems according to one aspect.
Figure 8B:
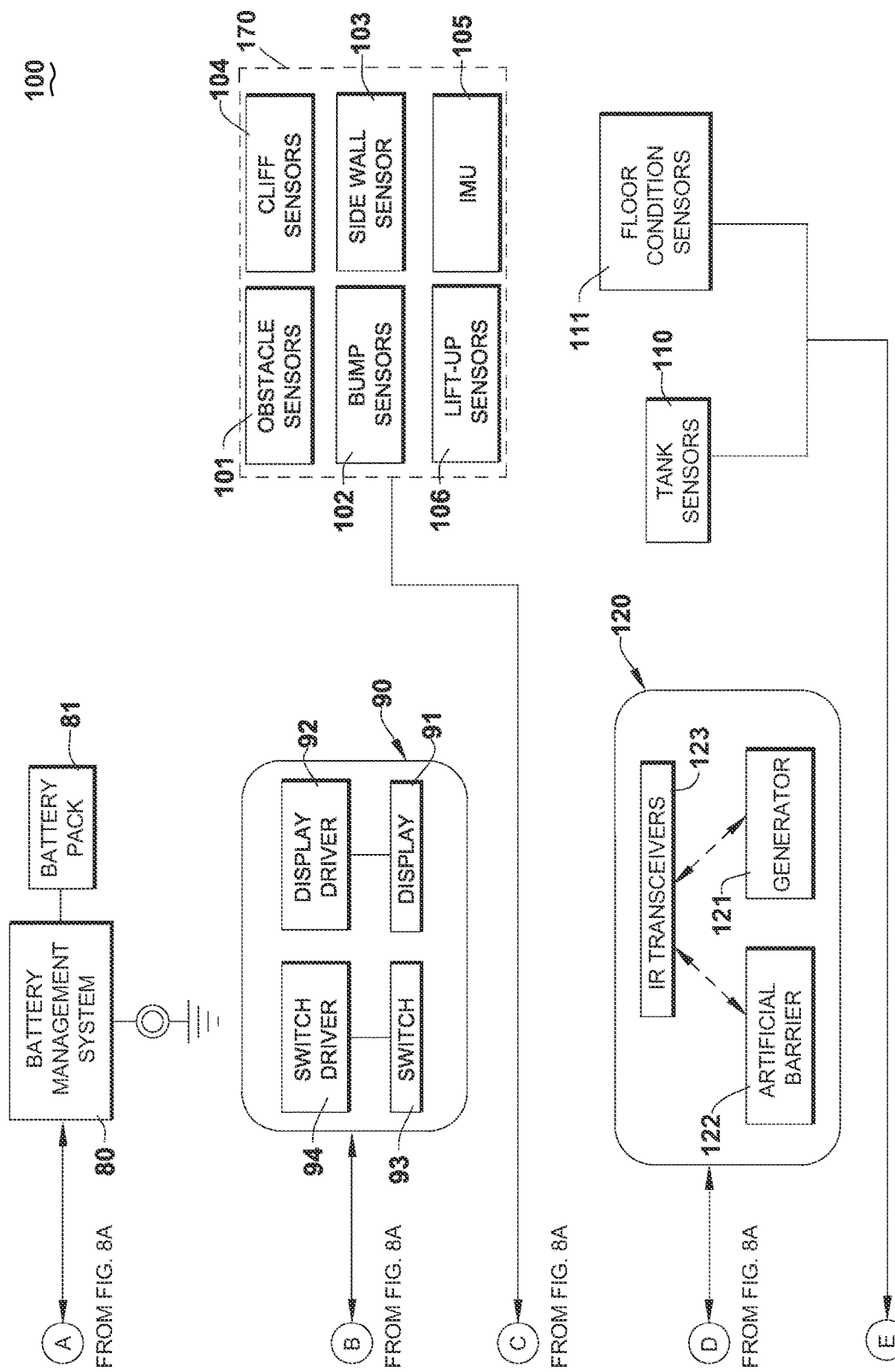
FIG. 8B is a schematic view of the autonomous floor cleaner of FIG. 2 illustrating additional functional systems according to one aspect.

Details regarding various aspects of autonomous floor cleaners in accordance with the present disclosure will now be described in connection with a perspective views (FIG. 1), exploded view (FIG. 2), partial sectional view (FIG. 3), and several functional block diagrams (FIGS. 8A-B). An exemplary autonomous floor cleaner 100 can include components of various functional systems in an autonomously moveable unit. The autonomous floor cleaner 100 can include a housing 110 (FIG. 1) adapted to selectively mount components of the systems to form a unitary movable device.

Figure 3:
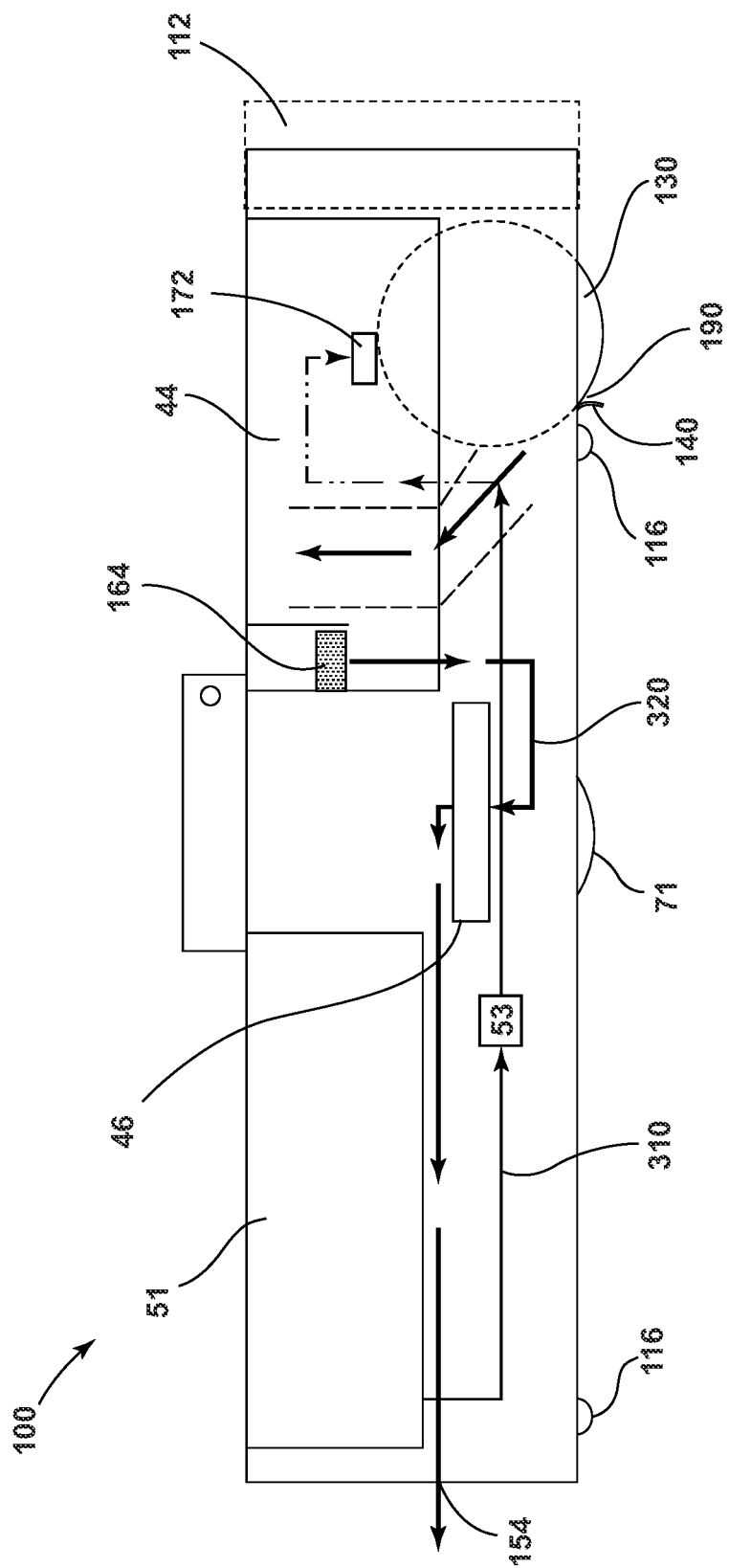
FIG. 3 is a schematic view of the autonomous wet cleaning robot of FIG. 1 showing a dispensing flow path and a recovery flow path for the robot.

FIG. 3 depicts a representational cleaning fluid dispense flow path 310, a vacuum fluid flow recovery path 320 including a vacuum exhaust path of the autonomous wet cleaning robot 100. With regard to the cleaning fluid dispense flow path 310, cleaning fluid can be routed from a supply tank 51 of cleaning fluid to a distributor 172 via a pump 53. With regard to the vacuum fluid flow recovery path 320, a suction source 46 can vacuum air and recovery fluid in to the recovery tank 44 through a filter 164 and exhaust via a vacuum exhaust path via the exhaust port 154. The filter 164 can be a mesh screen or another suitable filter.

As depicted in FIGS. 8A-B, a controller 20 may be operably coupled with the various functional systems of the autonomous floor cleaner 100 for controlling the operation of the autonomous floor cleaner 100. The controller 20 can be a microcontroller unit (CMU) that contains at least one central processing unit (CPU). Some of the exemplary functional systems of an autonomous floor cleaner in accordance with the present disclosure can include a fluid delivery system 50 for storing cleaning fluid and delivering the cleaning fluid to the surface to be cleaned, a recovery system 45 for removing liquid, debris, or both from the surface to be cleaned, a drive system 70 for autonomously moving the robot 100 over the surface to be cleaned, a navigation system 31 for providing guidance to the robot drive system, and a vacuum collection or recovery system 45. These various functional systems can be provided in different combinations in accordance with the present disclosure. For example, some autonomous floor cleaners in accordance with the present disclosure are wet vacuum robots, some are combination dry/wet vacuum robots, while others are wet mopping robots without vacuum. Further the functional system diagram of FIGS. 8A-B is exemplary, specific implementations may have different logical groupings among systems, may share components among system, and may have additional, different, or fewer systems or components.

The controller 20 includes any and all electrical circuitry and components to carry out the functions and algorithms described in the disclosure. Generally speaking, the controller 20 may include one or more microcontrollers, microprocessors, and/or other programmable electronics that are programmed to carry out the functions described herein. The controller 20 may additionally or alternatively include other electronic components that are programmed to carry out the functions described herein, or that support the microcontrollers, microprocessors, and/or other electronics. The other electronic components can include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the autonomous floor cleaner 100, or they may reside in a common location within the autonomous floor cleaner 100. When physically distributed, the components may communicate using any suitable serial or parallel communication protocol, such as, but not limited to: CAN, LIN, FireWire, I2C, RS-232, RS-422, RS-485, SPI, Ethernet, Universal Serial Bus (USB), and RF (cellular, WiFi, Bluetooth, Bluetooth Low Energy).

The controller 20 of the autonomous floor cleaner 100 in the illustrated embodiment of FIGS. 8A-B may include one or more processors that execute one or more applications 232 (software and/or includes firmware), one or more controller internal memory units (e.g., RAM and/or ROM), one or more controller external memory units, and one or more communication interfaces, amongst other electronic hardware.

The communication interface may be any type of communication link, including any of the types of communication links, including wired or wireless. The communication interface may facilitate external or internal, or both, communications. For instance, the communication interface may be coupled to or incorporate an antenna array. The antenna array may include one or more antennas configured to facilitate wireless communications, including BLE communications, Ultrawide Band (UWB) communications, or another type of wireless communications, or a combination thereof.

As an example, the communication interface may provide a wireless communication link with another system component in the form of a portable device (not shown), such as wireless communications according to the WiFi standard. In another example, the communication interface may be configured to communicate with a robot controller or other robot component via a wired link such as a CAN-based wired network that facilitates communication between a plurality of devices. The communication interface in one embodiment may include a display 91 and/or input interface for communicating information to and/or receiving information from the user.

A navigation/mapping system 31 can be provided in the autonomous floor cleaner 100 for guiding the movement of the autonomous floor cleaner 100 over the surface to be cleaned, generating and storing maps of the surface to be cleaned, and recording status or other environmental variable information. The controller 20 can receive input from the navigation/mapping system 31 or from a mobile device such as a smartphone (not shown) for directing the autonomous floor cleaner 12 over the surface to be cleaned. The navigation/mapping system 31 can include a memory 30 that can store any data useful for navigation, mapping or conducting a cycle of operation, including, but not limited to, maps for navigation, inputs from various sensors that are used to guide the movement of the autonomous floor cleaner 100, etc. For example, wheel encoders 32 can be placed on the drive shafts of wheels coupled to the autonomous floor cleaner 100 and configured to measure a distance traveled by the autonomous floor cleaner 100. The distance measurement can be provided as input to the controller 20.

In an autonomous mode of operation, the autonomous floor cleaner 100 can be configured to travel in any pattern useful for cleaning including boustrophedon or alternating rows (that is, the autonomous floor cleaner 100 travels from right-to-left and left-to-right on alternate rows), spiral trajectories, etc., while cleaning the floor surface, using input from various sensors to change direction or adjust its course as needed to avoid obstacles. In a manual mode of operation, movement of the autonomous floor cleaner 100 can be controlled using a mobile device such as a smartphone or tablet.

The robot can also include at least one agitator for agitating the surface to be cleaned. The agitator can be in the form of a brushroll 130 mounted for rotation about a substantially horizontal axis, relative to the surface over which the autonomous floor cleaner 100 moves. A drive assembly including a separate, dedicated brush motor 42 can be provided within the autonomous floor cleaner 100 to drive the brushroll 41. The brushroll can have a generally constant or variable speed—for example, one brushroll can be driven at a speed of about 1000 rotations per minute ("RPM"). Other agitators or brush rolls can also be provided, including one or more stationary or non-moving brushes, or one or more brushes that rotate about a substantially vertical axis.

The recovery system 45 can include a recovery pathway 320 through the housing 16 having an air inlet defined by a suction nozzle 15 and an air outlet (not shown), a debris receptacle, bin, or recovery tank 44 for receiving recovered liquid and/or debris for later disposal, and a suction source 46 in fluid communication with the suction nozzle 45 and the recovery tank 44 for generating a working air stream through the recovery pathway 320. The suction source 46 can include a vacuum motor 47 located fluidly upstream of the air outlet, and can define a portion of the recovery pathway.

The suction nozzle may be positioned in close proximity to the brushroll 130 to collect liquid and debris directly from the brushroll 130. In another aspect, the suction nozzle can be positioned to confront the surface to be cleaned to remove liquid and debris from the surface, rather than the brushroll 130.

The recovery tank 44 can define a portion of the recovery pathway and can comprise a separator (not shown) for separating liquid and debris from the working airstream. Optionally, a pre-motor filter and/or a post-motor filter 164 can be provided in the recovery pathway as well. The recovery pathway can further include various conduits, ducts, or tubes for fluid communication between the various components of the vacuuming system 45. The vacuum motor 47 can be positioned downstream of the recovery tank 44 in the recovery pathway. In other aspects, the vacuum motor 47 may be located fluidly upstream of the recovery tank 44.

The fluid delivery system 50 can include a supply tank 51 for storing a supply of cleaning fluid and at least one fluid distributor 52 in fluid communication with the supply tank 51 for depositing a cleaning fluid onto the brushroll 41 or surface to be cleaned. The cleaning fluid can be a liquid such as water or a cleaning solution specifically formulated for hard or soft surface cleaning. T, The fluid distributor 52 can be a manifold having multiple distributor outlets, such as drip bar 172 integrated with or joined to the recovery tank. The drip bar 172 can have multiple drip locations 174, depicted in FIGS. 4 and 6. Alternatively, the drip bar can be located elsewhere on in the nozzle, including the main housing. Further, instead of drip locations, in some embodiments, the fluid distributor 52 can be one or more spray nozzles with orifice(s) of sufficient size such that debris does not readily clog the nozzle(s).

A pump 53 can be provided in the fluid pathway between the supply tank 51 and the at least one fluid distributor 52 to control the flow of fluid to the at least one fluid distributor 52. The pump 53 can be driven by a pump motor 54 to move liquid at any flowrate suitable for a cleaning cycle of operation. In some embodiments, the pump 53 can be driven according to one or more cleaning fluid pooling mitigation strategies discussed in more detail below.

Various combinations of optional components can also be incorporated into the fluid delivery system 50, such as a heater 56 or one or more fluid control and mixing valves. The heater 56 can be configured, for example, to warm up the cleaning fluid before it is applied to the surface. In one aspect, the heater 56 can be an in-line fluid heater between the supply tank 51 and the distributor 52. In another example, the heater 56 can be a steam generating assembly. The steam assembly may be in fluid communication with the supply tank 51 such that some or all the liquid applied to the floor surface is heated to vapor.

The agitation assembly 60 can be utilized to disperse the distributed fluid on the floor surface and remove moistened dust and other debris. The agitation assembly 60 can include at least one agitator 61 that can optionally be rotatable. For example, the at least one agitator 61 can be driven to rotate about a vertical axis that intersects with the center of the respective agitator 61. In one aspect, the at least one agitator 61 may be a pad, a brushroll, or any other suitable mopping or sweeping element. A drive assembly including at least one agitator motor 62 can be provided as part of the debris removal assembly 60. Each agitator 61 can optionally be detachable for purposes of cleaning and maintenance.

The drive system 70 can include one or more drive wheels 71 for driving the autonomous floor cleaner 100 across a surface to be cleaned. The drive wheels can be operated by a common wheel motor 72 or individual wheel motors coupled with the drive wheels by a transmission, which may include a gear train assembly or another suitable transmission. The drive system 70 can receive inputs from the controller 20 for driving the autonomous floor cleaner 100 across a floor, based on inputs from the navigation/mapping system 30 for the autonomous mode of operation or based on inputs from a mobile device for the manual mode of operation. The drive wheels 71 can be driven in a forward or reverse direction to move the unit forwardly or rearwardly. Furthermore, the drive wheels 71 can be operated simultaneously at the same rotational speed for linear motion or independently at different rotational speeds to turn the autonomous floor cleaner 100 in a desired direction. The autonomous floor cleaner 100 can also include one or more non-driven wheels 116 to help support the robot on the surface to be cleaned.

The autonomous floor cleaner 100 can include any number of motors suitable for performing locomotion and cleaning. In one example, motors 42, 54, 72 can be provided to rotate the brushroll 41, the pump 53, and the drive wheels 71. Vacuum motor 47 can rotate a fan (not shown) of the suction source 46.

In addition, a brush motor driver 43, vacuum motor driver 48, pump motor driver 55, and wheel motor driver 73 can be provided for controlling the brush motor 42, vacuum motor 47, pump motor 54, and wheel motor 72, respectively. The motor drivers 43, 48, 55, 73 can act as an interface between the controller 20 and their respective motors 42, 47, 54, 72. The motor drivers 43, 48, 55, 73 can also be packaged as an integrated circuit chip (IC). It is also contemplated that a single wheel motor driver 73 can control multiple wheel motors 72 simultaneously.

Turning to FIG. 8B, the motor drivers 43, 48, 55, 73 (FIG. 8A) can be electrically coupled to a battery management system 80 that includes a built-in rechargeable battery or removable battery pack 81. In one example, the battery pack 81 can include lithium ion batteries. Charging contacts for the battery pack 81 can be provided on an exterior surface of the autonomous floor cleaner 12. The docking station 18 can be provided with corresponding charging contacts that can mate to the charging contacts on the exterior surface of the autonomous floor cleaner 12. The battery pack 81 can be selectively removable from the autonomous floor cleaner 12 such that it can be plugged into mains voltage via a DC transformer for replenishment of electrical power, i.e. charging. When inserted into the autonomous floor cleaner 12, the removable battery pack 81 can be at least partially located outside the housing 16 or completely enclosed in a compartment within the housing 16, in non-limiting examples and depending upon the implementation.

The controller 20 may be further operably coupled with a user interface (UI) 90 on the autonomous floor cleaner 12 for receiving inputs from a user. The user interface 90 can be used to select an operation cycle for the autonomous floor cleaner 12 or otherwise control the operation of the autonomous floor cleaner 12. The user interface 90 can have a display 91, such as an LED display, for providing visual notifications to the user. A display driver 92 can be provided for controlling the display 91, and acts as an interface between the controller 20 and the display 91. The display driver 92 may be an integrated circuit chip (IC). The autonomous floor cleaner 12 can further be provided with a speaker (not shown) for providing audible notifications to the user. The autonomous floor cleaner 12 can further be provided with one or more cameras or stereo cameras for acquiring visible notifications from the user. The user interface 90 can further have one or more switches 93 that are actuated by the user to provide input to the controller 20 to control the operation of various components of the autonomous floor cleaner 12. A switch driver 94 can be provided for controlling the switch 93, and acts as an interface between the controller 20 and the switch 93.

The controller 20 can further be operably coupled with various sensors for receiving input about the environment and can use the sensor input to control the operation of the autonomous floor cleaner 12. The sensors can detect features of the surrounding environment of the autonomous floor cleaner 12 including, but not limited to, walls, floors, chair legs, table legs, footstools, pets, consumers, and other obstacles. The sensor input can further be stored in a memory or used to develop maps for navigation. Some exemplary sensors are illustrated in FIG. 8B, and described below. Although it is understood that not all sensors shown may be provided, additional sensors may be provided, and that all of the possible sensors can be provided in any combination.

The autonomous floor cleaner 12 can include a positioning or localization system 121. The localization system 121 can include one or more sensors, including but not limited to the sensors described above. In one non-limiting example, the localization system 121 can include obstacle sensors 101 determining the position of the autonomous floor cleaner 12, such as a stereo camera in a non-limiting example, for distance and position sensing. The obstacle sensors 101 can be mounted to the housing 16 of the autonomous floor cleaner 12, such as in the front of the housing 16 to determine the distance to obstacles in front of the autonomous floor cleaner 12. Input from the obstacle sensors 101 can be used to slow down or adjust the course of the autonomous floor cleaner 12 in response to objects being detected.

The autonomous floor cleaner can includes sensors capable of providing sufficient sensor input to build a 3D map of the autonomous floor cleaner's environment, such as stereo cameras. The colorations used in connection with generating the 2D map from the stereo cameras or other sensors may also be communicated to a mobile device application and utilized to create an augmented reality experience. For example, based on the colorations and other stereo camera data, an application can be configured to provide a live, augmented reality view of autonomous robot environment where the uncleaned, cleaned, and estimated wet areas are highlighted or otherwise displayed.

Bump sensors 102 can also be provided in the localization system 121 for determining front or side impacts to the autonomous floor cleaner 12. The bump sensors 102 may be integrated with the housing 16, such as with a bumper 112 (FIG. 1). Output signals from the bump sensors 102 provide inputs to the controller 20 for selecting an obstacle avoidance algorithm. Further, the output signals from the bump sensors can provide inputs to the controller 20 for selecting or triggering a cleaning fluid pooling mitigation strategy.

The localization system 121 can further include a side wall sensor 103 (also known as a wall following sensor) and a cliff sensor 104. The side wall sensor 103 or cliff sensor 104 can be optical, mechanical, or ultrasonic sensors, including reflective or time-of-flight sensors. The side wall sensor 103 can be located near the side of the housing 16 and can include a side-facing optical position sensor that provides distance feedback and controls the autonomous floor cleaner 12 so that autonomous floor cleaner 12 can follow near a wall without contacting the wall. The cliff sensors 104 can be bottom-facing optical position sensors that provide distance feedback and control the autonomous floor cleaner 12 so that the autonomous floor cleaner 12 can avoid excessive drops such as stairwells or ledges. 1). Output signals for these sensors can also provide inputs to the controller 20 for selecting or triggering a cleaning fluid pooling mitigation strategy, as discussed in more detail below.

The localization system 121 can also include an inertial measurement unit (IMU) 105 to measure and report the robot's acceleration, angular rate, magnetic field, other IMU sensed values, or any combination thereof of the autonomous floor cleaner 12, using, for example, a combination of at least one accelerometer, gyroscope, and, optionally, magnetometer or compass. The IMU 105 can be an integrated inertial sensor located on the controller 20 and can be a nine-axis gyroscope or accelerometer to sense linear, rotational or magnetic field acceleration. The IMU 105 can use acceleration input data to calculate and communicate change in velocity and pose to the controller for navigating the autonomous floor cleaner 12 around the surface to be cleaned. The IMU can coorperate with other obstacle detection components of the localization system 121, such as a bumper, infrared, LIDAR and/or one or more other sensors. The localization system 121 or essentially one or more of any sensor on the robot can be utilized can be utilized in identifying a trigger for or executing a cleaning fluid mitigation strategy.

The localization system 121 can further include one or more lift-up sensors 106 which detect when the autonomous floor cleaner 100 is lifted off the surface to be cleaned e.g. if a user picks up the autonomous floor cleaner 100. This information is provided as an input to the controller 20, which can halt operation of the pump motor 54, brush motor 42, vacuum motor 47, wheel motor 73, or any combination thereof, in response to a detected lift-up event. The lift-up sensors 106 may also detect when the autonomous floor cleaner 100 is in contact with the surface to be cleaned, such as when the user places the autonomous floor cleaner 100 back on the ground. Upon such input, the controller 20 may resume operation of the pump motor 54, brush motor 42, vacuum motor 47, wheel motor 73, or any combination thereof.

The autonomous floor cleaner 100 can optionally include one or more tank sensors 110 for detecting a characteristic or status of the supply tank 51 or the recovery tank 160. In one example, one or more pressure sensors for detecting the weight of the supply tank 51 or the recovery tank can be provided. In another example, one or more magnetic sensors for detecting the presence of the supply tank 51 or recovery tank 160 can be provided. This information can be provided as an input to the controller 20, which may prevent operation of the autonomous floor cleaner 100 until the supply tank 51 is filled, the recovery tank 160 is emptied, or both are properly installed, in non-limiting examples. The controller 20 may also direct the display 91 to provide a notification to the user that either or both of the supply tank 51 and recovery tank is missing.

The autonomous floor cleaner 100 can further include one or more floor condition sensors 111 for detecting a condition of the surface to be cleaned. For example, the autonomous floor cleaner 100 can be provided with an IR dirt sensor, a stain sensor, an odor sensor, or a wet mess sensor. The floor condition sensors 111 provide input to the controller that may direct operation of the autonomous floor cleaner 100 based on the condition of the surface to be cleaned, such as by selecting or modifying a cleaning cycle. Optionally, the floor condition sensors 111 can also provide input for display on a mobile device. The floor condition sensors 111 can also provide input to the controller 20 for selecting or triggering a cleaning fluid pooling mitigation strategy, as discussed in more detail below. The floor condition sensors 111 can also provide input to the controller 20 for assessing the effectiveness of a cleaning fluid pooling mitigation strategy.

Optionally, an artificial barrier system 120 can be provided for containing the autonomous floor cleaner 100 within a user-determined boundary. The artificial barrier system 120 can include an artificial barrier generator 121 for generating an artificial barrier 122 that is an auxiliary device of the system separate from the robot. Some embodiments can include one or more IR transceivers 123. For example, the autonomous floor cleaner 12 can have a plurality of IR transceivers (also referred to as IR XCVRs) 123 around the perimeter of the autonomous floor cleaner 12 to sense IR signals emitted from an artificial barrier generator 121 and output corresponding signals to the controller 20, which can be used to navigate the robot 100. Alternatively, or in addition, the artificial barrier system 120 may utilize virtual barriers input by a user on a mobile device (not shown). That is, instead of placing physical artificial barriers 122 about a room, the user can be presented on a user interface with the ability to indicate a virtual barrier, such as a keep-in zone, keep-out zone, or another virtual barrier. The autonomous floor cleaner 12 can be configured to respect the virtual barrier. For example, the autonomous floor cleaner 100 can be programmed to avoid crossing a keep-out zone or virtual barrier. As another example, the autonomous floor cleaner 100 may be programmed to efficiently travel to and from a docking station and one or more keep-in zones. Further the autonomous floor cleaner 100 may be programmed to only operate within a certain mode, such as a particular cleaning mode, depending upon the virtual barriers. For example, while within a particular keep-in zone. The virtual barriers can be respected by the autonomous floor cleaner 100 by tracking the position of the autonomous floor cleaner 100 relative to a map of the surrounding area, which includes the one or more virtual barriers indicated by the user. Put another way, the autonomous floor cleaner 100 can be configured to localize and recognize its position within an environment map. That position within the environment map can be translated and compared against the position of the virtual barrier identified via the user interface in order to map the virtual barriers to the environment map of the autonomous floor cleaner, which can then be respected according to the virtual barrier response configuration (e.g., keep-out, keep-in, etc.). Cleaning fluid pooling mitigation strategies can be selected or triggered based upon relative position with respect to an artificial barrier (virtual or physical).

The autonomous floor cleaner 100 can operate in one of a number of modes. For example, the modes can include one or more of a wet mode and a dry mode. During a wet mode of operation, liquid from the supply tank 51 is applied to the floor surface and the brush roll 130 is rotated. During a dry mode of operation, the brush roll 130 is rotated and no liquid is applied to the floor surface.

The pump 53 (FIG. 8A) can be driven according to a pulse-width modulation (PWM) signal 28. Pulse-width modulation is a method of communication by generating a pulsing signal. Pulse-width modulation can be utilized for controlling the amplitude of digital signals in order to control devices and applications, such as the pump motor 54. The PWM signal 28 can control an amount of power given to the pump 53 by cycling the on-and-off phases of a digital signal at a specific frequency and by varying the width of an "on" phase. The width of the "on" phase is also known as duty cycle, which can be expressed as the percentage of being on (e.g., a 30% duty cycle). The pump 53 can essentially receive a steady power input with an average voltage value which is the result of the duty cycle and can be less than the maximum voltage capable of being delivered from the battery pack 81. The PWM signal 28 can be transmitted from the controller 20 and configured to provide a set flowrate of deposited cleaning fluid. In one non-limiting example of operation, the PWM signal 28 can cyclically energize the pump 53 for a first predetermined time duration, such as 40 milliseconds, and then de-energize the pump for a second predetermined time duration, such as 2 seconds, at a rate of 50 Hz and a duty cycle of 40%. Higher flow rates can be achieved by, for example, increasing either or both of the duty cycle or frequency. In this manner, the controller 20 can provide essentially any suitable or customized flow rate, including a low flow rate, from the pump 53 being powered from the battery pack 81.

Referring to FIGS. 1-4, details of an exemplary autonomous wet cleaning robot 100 capable of carrying out cleaning fluid pooling mitigation strategies will now be described. FIG. 1 shows a perspective view of an autonomous wet cleaning robot 100 according to one aspect. The autonomous wet cleaning robot 100 includes a robot housing 110. As shown in FIG. 1, the robot housing 110 can be D-shaped. However, in alternate aspects, the robot housing 110 may be substantially cylindrical or essentially any other suitable shape for an autonomous wet cleaning robot. The robot housing 110 may include a bumper 112. The bumper 112 can be configured to move in response to the robot 100 encountering an obstacle, such as a piece of furniture or a wall. The compression of the bumper 112 can trigger a switch or other sensor in the robot housing 110. For example, in response to activation of the switch, the robot 100 can be configured to perform a corrective action, such as backing away from the obstacle or executing some other maneuver to disengage and avoid the obstacle. Further, in response to activation of the switch, the robot 100 can be configured to execute a fluid cleaning pooling mitigation strategy.

FIG. 1 also depicts a portion of the autonomous wet cleaning robot 100 navigation system that provides the robot with information about its environment for use in efficiently and effectively traversing and cleaning the environment, such as a wood, vinyl, tile, or other hard-surfaced floor. In the depicted embodiment, the navigation system includes a Light Detection and Ranging ("LIDAR") system 120. In alternate aspects, the navigation system can include a Visual Simultaneous Localization and Mapping (VSLAM) system or another type of navigation system. The navigation system generally can include one or more cameras, thermal imaging devices, video cameras, or essentially any combination of such components or other sensors that can effectively provide robot navigation about an environment. The navigation system can obtain various navigation data and communicate, directly or indirectly, with the robot drive system to cause the robot to intelligently traverse the environment based on the navigation data.

Figure 2:
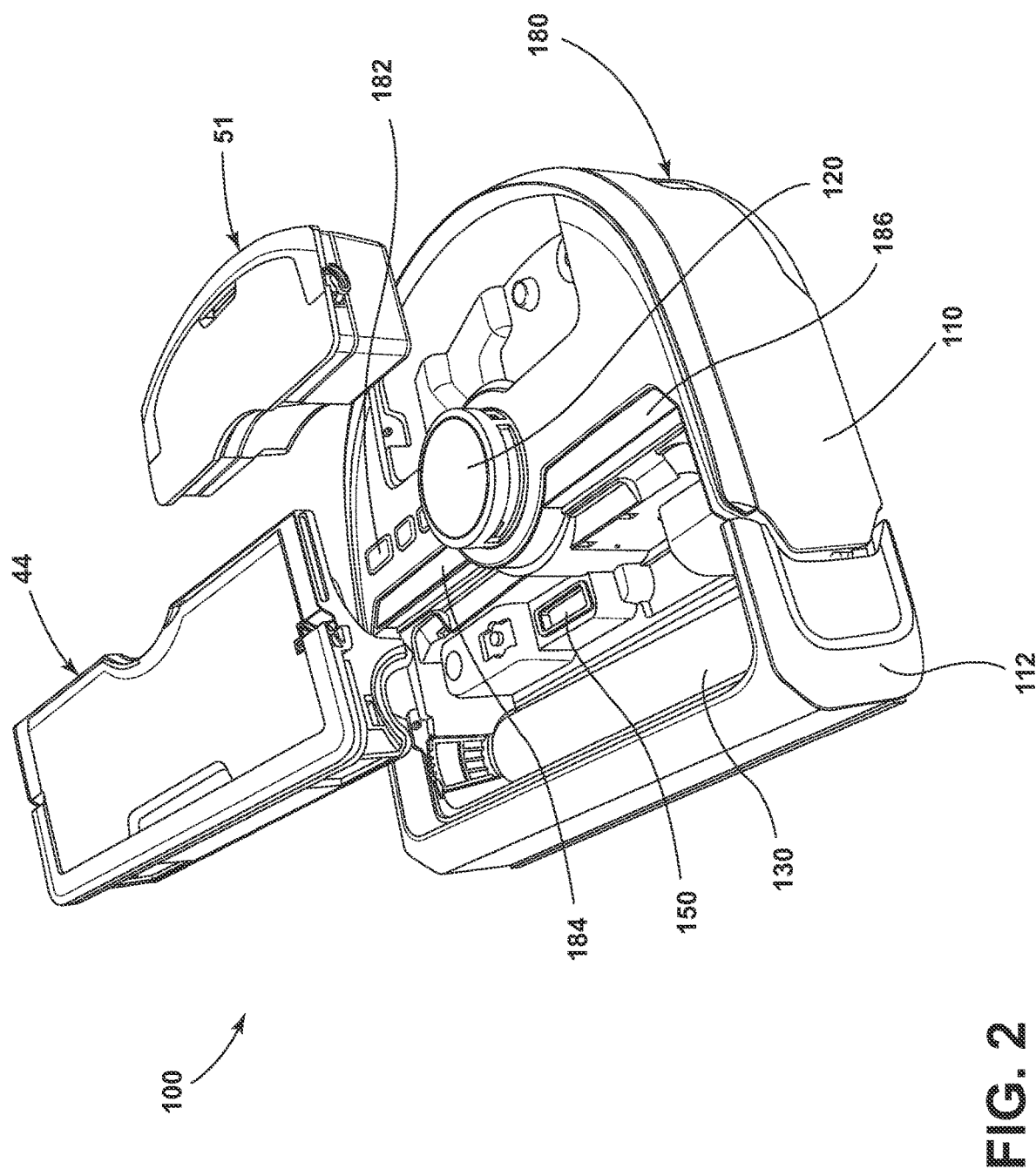
FIG. 2 is a partially exploded view of the autonomous wet cleaning robot of FIG. 1.

FIG. 2 shows an exploded perspective view of the autonomous wet cleaning robot 100 of FIG. 1. The autonomous wet cleaning robot 100 may include at least one agitator system, such as brushroll 130. The brushroll 130 can be a hybrid brushroll suitable for use on both hard and soft surfaces, and for wet or dry vacuum cleaning. In one aspect shown in the sectional view of FIG. 4, the brushroll 130 includes a dowel 134 supporting at least one agitation element. The agitation element can comprise microfiber material 136 provided on the dowel 134. The microfiber material can be constructed of polyester, polyamides, or a conjugation of materials including polypropylene or any other suitable material known in the art from which to construct microfiber. Other aspects of brush rolls in accordance with the present disclosure can have different configurations and utilize different materials. For example, the brushroll can further include a plurality of bristles (not shown) extending from the dowel 134, with the microfiber material 136 arranged around and/or between the bristles. The bristles can be tufted or unitary bristle strips and constructed of nylon, or any other suitable synthetic or natural fiber. In another example, the brushroll can be a bristle brushroll suitable for use on soft surfaces, and comprise bristles and no microfiber material. Alternatively or in addition, the robot 100 can be provided with multiple, interchangeable brushrolls that allow for the selection of a brushroll depending on the cleaning task to be performed, the floor type of be cleaned, or other factors. The brush rolls can have the same mounting interface such that one brushroll can be swapped out for another brushroll on the robot 100. The brushroll 130 can be selectively removable and replaceable. A brushroll tab can be pulled by the user to remove the brushroll from the brushroll chamber and a new brushroll can be installed by inserting one end of the brushroll into a slot then clicking the other end into place.

Optionally, the autonomous floor cleaner can include an additional agitator, such as one or more edge brushes, cleaning pads or other suitable agitators, that can complement the brushroll 130 or otherwise aid with cleaning, recovery, or both.

A squeegee 140 (shown in FIGS. 3-4) can be located behind the brushroll to aid in control of the cleaning fluid on the floor. The squeegee 140 can disperse the liquid left behind by the agitator 130 so that the liquid may be removed by the suction mechanism 152.

The suction source 46 (shown in FIG. 3) can vacuum fluid through a suction inlet adjacent the brushroll 130, the recovery tank 44, and a filter 164 along a fluid flow path 320. This allows the robot to recover the cleaning fluid and debris from the brushroll and floor. The liquid removed from the floor can be stored in the recovery tank 44. In one aspect, the recovery tank 160 may have a capacity of 500 mL and register as being full at about 280 mL.

The supply tank 51 can hold essentially any suitable cleaning fluid and may be referred to a as a clean tank, cleaning fluid reservoir. In one aspect, the supply tank 51 can have a 480 mL capacity. Alternative supply tanks can have more or less capacity. The pump 54 is in fluid communication with the reservoir 51 and is configured to pump the cleaning fluid from the supply tank to a distributor 52, such as drip bar 172 shown in FIGS. 3-4. In one aspect of the present disclosure the pump 54 pumps cleaning fluid to the drip bar 172, which drips the cleaning fluid onto the brushroll at a selected drip rate defined by the characteristics of the drip bar. The drip bar of the present disclosure is configured to have a flow rate of about 8-10 mL of cleaning fluid per minute. The drip bar can be configured in a different manner to increase or decrease the rate at which the cleaning fluid dispenses, for example by changing the number or size of the drip bar apertures or other features of the drip bar.

The robot can include a variety of different user interface ("UI") elements. For example, the robot can include essentially any combination of a power button, one or more mode or other type of selection buttons, speaker, a display, or other user interface elements. Perhaps as best shown in FIG. 2, the exemplary autonomous floor cleaner 100 depicts a plurality of buttons, including a power switch 180 and a clean button 182 that a user can push to have the robot 100 initiate a cleaning cycle. The autonomous floor cleaner can include various indicators, such as a plurality of LED strips 184, 186, to display status or other information to the operator.

Figure 4:
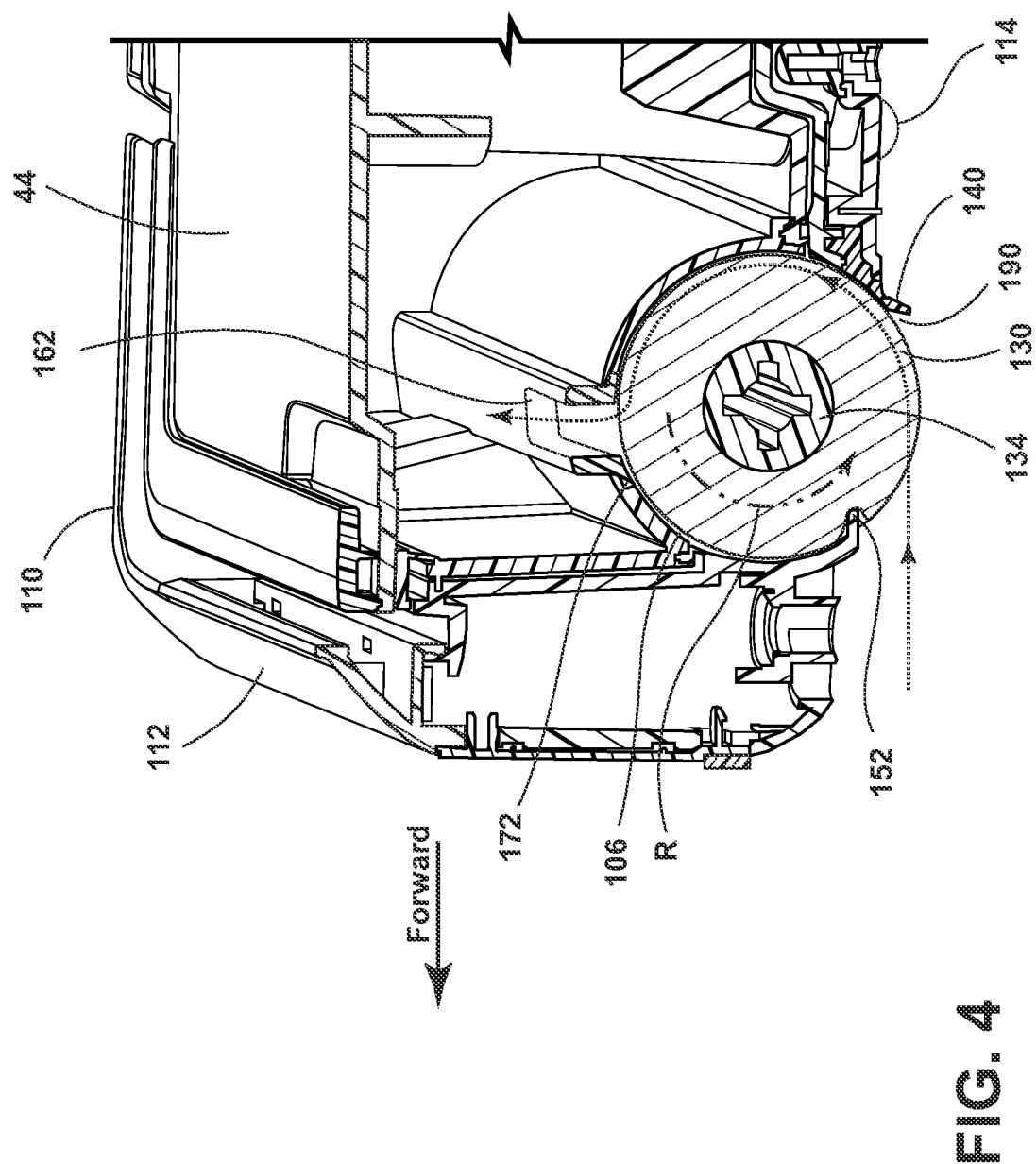
FIG. 4 is a partial cross-sectional side perspective view of the autonomous wet cleaning robot of FIG. 1, taken along the line IV-IV of FIG. 1.

As shown in FIGS. 2 and 4, the brushroll 130 can be provided at a forward portion of the robot housing 110 and received in a brushroll chamber 106. The brushroll chamber 106 of the present disclosure is disposed at a forward section of the robot housing 110. As shown in FIG. 4, the brushroll 130 is mounted within the brushroll chamber 106 for rotational movement about an axis R. A debris inlet 162 is configured to extract liquid and debris from the brushroll 130, the surface to be cleaned, or both. The debris inlet 162 may be referred to as a suction nozzle.

FIG. 4 shows a partial cross-sectional view of the autonomous wet cleaning robot 100 along the line IV-IV of FIG. 1. In operation, fluid can be pumped from the supply tank 51 (FIG. 1) to the drip bar 172 and dispensed onto the brushroll 130. The cleaning fluid can be dripped onto the brushroll 130 as the brushroll rotates. The flow rate can be selected to provide a desired wetness for the brushroll 130 based on a number of different factors. For example, the brushroll RPM, desired amount of cleaning fluid to reach the floor surface, the autonomous robot speed, the effect of the interference wiper 152, size, shape, and number of drip bar outlets, and thickness and makeup of the microfiber are a few exemplary factors that can be considered.

An interference wiper 152 is mounted at a forward portion of the agitator chamber 106 and disposed generally parallel to the surface to be cleaned. As shown in FIG. 4, the interference wiper 152 is configured to interface with a leading portion of the brushroll 130 as it rotates in the direction R. The interference wiper 132 is positioned after the distributor 172, such that the freshly wetted portion of brushroll 130 rotates past the interference wiper 132, which scrapes excess liquid off the brushroll 130 before the brushroll 130 reaches the surface to be cleaned. The wiper 152 can be located at other positions in relation to the agitator in alternative embodiments. The wiper 152 can be rigid and non-flexible so that it does not yield or flex by engagement with the brushroll 130 and the brushroll sheds a generally consistent amount of fluid relative to the wetness of the brushroll. For example, the wiper 132 can be formed of rigid thermoplastic material, such as poly(methyl methacrylate) ("PMMA"), polycarbonate, or acrylonitrile butadiene styrene (ABS). In other embodiments, the wiper 132 can be less rigid and have a flexible body that provides a suitable interference with the brushroll.

After the brushroll rotates through the interference wiper and sheds excess cleaning fluid, the brushroll 130 contacts the floor surface dispensing some of the cleaning fluid onto the floor surface and picking up debris off the floor surface. For example, a microfiber brushroll can simultaneously wash sealed hardwood, laminate, or tile floors while picking up dry debris. The rate of rotation of the brushroll, speed of the autonomous floor cleaner, and other characteristics of the autonomous floor cleaner can be selected to provide an efficient and effective wet clean to the floor surface. During normal operation while the robot moves about the floor surface, the brushroll leaves some cleaner fluid on the floor surface, which can be squeegeed to aid in controlling the flow of cleaner fluid on the floor surface.

The squeegee 140 of the depicted embodiment is a generally flat smooth rubber blade disposed adjacent to the brushroll. The squeegee 140 assists in controlling and capturing fluid from the floor surface. That is, as the autonomous floor cleaner 100 moves forward while simultaneously rotating the wet brushroll 130 across the floor surface, the squeegee 140 interacts with cleaning fluid dispensed onto the floor surface or other fluid on the floor surface. For example, the cleaning solution can act as a lubricant breaking up dirt on the floor surface, then the squeegee 140 can be used to draw the cleaning solution-borne dirt off the floor surface leaving a clean floor surface. In the depicted embodiment, a squeegee 140 is mounted to the robot housing 110 behind the brushroll 130 and extending out of the brushroll chamber toward the floor surface. The squeegee 140 is configured to contact the floor surface as the autonomous floor cleaner 100 moves across the surface to be cleaned. The squeegee 140 wipes residual liquid from the surface to be cleaned so that it can be drawn into the recovery pathway via the debris inlet 162, thereby reducing moisture and streaking on the surface to be cleaned. That is, the squeegee 140 wipes much of the residual liquid from the surface to be cleaned, but can leave a small trail of liquid that quickly dries. The small amount of residual liquid from the squeegee can be desirable as it indicates to the operator that the product is cleaning properly. The squeegee 140 can be smooth, or optionally comprise nubs on the end thereof. The squeegee 140 can be pliant, i.e. flexible, or resilient, in order to bend readily according to the contour of the surface to be cleaned yet remain undeformed by normal use of the autonomous wet cleaning robot 100. The squeegee 140 can be formed of a resilient polymeric material, such as ethylene propylene diene monomer ("EPDM") rubber, polyvinyl chloride ("PVC"), a rubber copolymer such as nitrile butadiene rubber, or any suitable material known in the art of sufficient rigidity to remain substantially undeformed during normal use of the robot 100.

Due to a variety of factors, such as the position of the squeegee relative to the brushroll 130, speed of the autonomous floor cleaner, rotation rate of the brushroll, rate of suction of the suction source 46, and potentially other factors, the squeegeed dirty cleaning solution can be urged toward the brushroll 130. As the autonomous floor cleaner continues in a forward direction, the squeegee 140 carries the cleaning fluid forward to eventually be captured by the brushroll 130. As the brushroll rotates dirty cleaning fluid and debris are vacuumed into the recovery tank 44 via debris inlet 162. If the autonomous floor cleaner turns or backs up, a pool of cleaning fluid can be left on the floor surface in the gap between the brushroll 130 and the squeegee 140, which can be referred to as a pooling pocket 190.

A variety of different cleaning fluid pooling mitigation strategies in accordance with the present disclosure will now be discussed in detail. The cleaning fluid pooling mitigation strategies of the present disclosure are directed to systems and methods that reduce, remediate, or prevent cleaning fluid pooling caused by an autonomous floor cleaner. The cleaning fluid pooling mitigation strategies can generally involve controlling one or more systems of the autonomous floor cleaner to reduce, remediate, or prevent cleaning fluid pooling caused by an autonomous floor cleaner. Essentially, each cleaning fluid pooling mitigation strategy involves one or a combination of adjustments to robot behavior in response to certain events. Cleaning fluid can pool as a result of a variety of different events, such as the autonomous floor cleaner slowing down or stopping due to identifying or encountering an obstacle, becoming stuck in a location, the robot stopping, traction issues or due to certain navigation routines, such as turning around or after a corn-row maneuver, to name a few examples. The various cleaning fluid pooling mitigation strategies can include reducing or stopping the cleaning fluid pump in response to certain autonomous floor cleaner events, reducing or stopping brushroll speed in response to certain autonomous floor cleaner events, reducing, stopping, or reversing drive speed in response to certain autonomous floor robot maneuvers, executing one or more specific robot maneuvers to improve distribution of cleaning fluid to an agitator or improve fluid extraction, or combinations thereof.

The autonomous wet floor cleaner can operate according to autonomous wet floor cleaner instructions stored in memory. The instructions can be predefined static instructions, dynamic instructions that are adjusted based on the state of the autonomous wet floor cleaner and various sensors and other inputs, or any combination thereof. Some of the autonomous wet floor cleaner instructions can be identified as cleaning fluid pooling precursor events. For example, certain autonomous wet floor cleaner instructions (i.e., referring to individual instructions or sequences of multiple instructions) can be tagged, flagged, or otherwise identified as cleaning fluid pooling precursor events, meaning that they are instructions that, when executed, will or have a high likelihood of causing the autonomous wet floor cleaner to dispense excess cleaning fluid such that a pool on the surface forms. The autonomous wet floor cleaner can identify a particular autonomous wet floor cleaner instruction as a cleaning fluid pooling precursor event in a variety of different ways. For example, certain instructions can be heuristically or experimentally identified as cleaning fluid pooling precursor events and the association between the two can be stored in memory for reference by the autonomous floor cleaner during an identification step. As another example, certain autonomous floor cleaner state parameters can be tracked and utilized to identify whether an autonomous wet floor cleaner instruction is a cleaning fluid pooling precursor event, e.g., because execution of the instruction will bring about a robot state (i.e., particular set of parameter values) that will (or have above a threshold prediction) of causing a cleaning fluid pooling event.

In another aspect of an autonomous wet floor cleaner, the autonomous floor cleaner does not actively identify certain instructions as cleaning fluid pooling precursor events, but instead controls operation of the inter-connected autonomous floor cleaner systems dynamically to mitigate cleaning fluid pooling. For example, the autonomous wet floor cleaner can be configured to control the drive system, cleaning fluid dispenser system, and the recovery system to ensure the drive speed, pump speed, and suction speed are proportionally adjusted to mitigate cleaning fluid pooling. That is, in response to changes to one of the systems, one or more of the other autonomous wet floor cleaner systems can be adjusted to ensure suitable operation according to a cleaning fluid pooling mitigation strategy.

Various examples of cleaning fluid pooling mitigation strategies will now be discussed in detail within the context of the autonomous floor cleaner event scenarios depicted in FIGS. 5A-F.

Each of the exemplary scenarios depicted in FIGS. 5A-F illustrates a top down representational view of an exemplary autonomous floor cleaner 100 during operation traversing a floor surface 500 of an environment. Each scenario depicts a different robot event, such as general driving (FIG. 5A), obstacle recognition (FIG. 5B), obstacle response (FIG. 5C), robot turn (FIG. 5D), the robot being stuck (FIG. 5E), or robot shutdown (FIG. 5F) to aid in illustrating various different cleaning fluid mitigation strategies that can be employed. It should be understood that these scenarios are not the only scenarios in which the various pooling mitigation strategies can be effectively executed. Further, it should be understood that the particular combination of robot actions that makeup the various pooling mitigation strategies described in connection with these scenario are exemplary and non-exhaustive. In each scenario, the relative position of the brushroll 130, squeegee 140 and the pooling pocket 190 where cleaning fluid typically pools are illustrated to aid with explanation of the various pooling mitigation strategies.

Figure 5C:
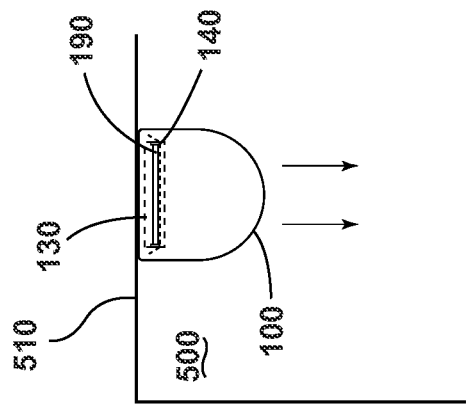
FIG. 5C is a similar top down representational view showing the autonomous wet cleaning robot responding to encountering an obstacle according to one aspect.
Figure 5B:
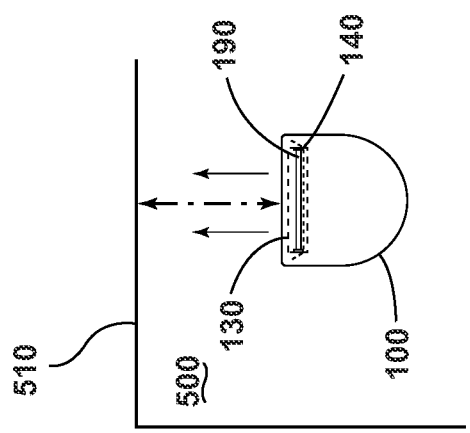
FIG. 5B is a similar top down representational view showing the autonomous wet cleaning robot undergoing obstacle recognition according to one aspect.
Figure 5A:
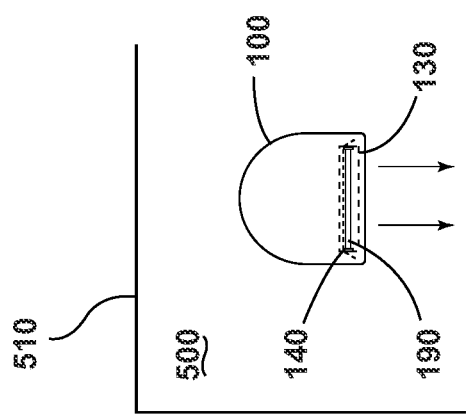
FIG. 5A is a top down representational view of the autonomous wet cleaning robot of FIG. 1 during operation traversing a floor surface, showing the autonomous wet cleaning robot driving forward according to one aspect.

FIG. 5A shows an exemplary autonomous wet floor cleaner 100 driving forward. While during normal operation, the various cleaning fluid dispensing characteristics of the autonomous floor cleaner (e.g., cleaning solution flow rate, drive speed, and brushroll speed) can be tuned such that the amount of cleaning fluid dispensed is suitable. During general driving, the tuned values may be dynamically controlled or effected by an external force resulting in a change to the cleaning solution flow rate onto the floor surface, which can cause pooling. For example, the autonomous floor cleaner may have multiple speed settings that can be selected based on a consumer's desire, detected floor surface, or a variety of other factors. One pooling mitigation strategy is to balance the cleaning fluid dispensing characteristics dynamically. For example, if the robot speed is reduced (e.g., due to control by the robot or external forces), the cleaning fluid flow rate from the drip bar can be adjusted, e.g., by controlling the pump to compensate for the reduction in robot speed, the brushroll speed can be reduced to compensate for the reduction in robot speed, or a combination of the two. Put simply, one or more dynamic adjustments can be made to balance for a change in target cleaning fluid flow rate.

FIG. 5B shows an autonomous floor cleaner 100 recognizing an obstacle. The robot 100 is shown approaching an obstacle that is expected due to sensors on the robot. As shown in FIG. 5B, the obstacle in this exemplary scenario is a wall 510. In alternative scenarios, the obstacle can be essentially anything that would impede progress of the robot 100 were the navigation path to continue. For example, the obstacle could be a piece of furniture, such as a couch, a stray independent article, such as a toy, or another object. With conventional robots, as they approach an obstacle, the robot 100 is typically configured to perform a robot maneuver to transition away from driving forward in order to prevent collision with the obstacle. For example, common responses in this scenario for an autonomous floor cleaner can include driving in the reverse direction, turning to avoid the obstacle, or stopping. Excess pooling of liquid in the pooling pocket 190 can occur as a result of many of the typical responses to identifying an obstacle. To prevent or remediate excess cleaning fluid pooling in the pooling pocket 190, the robot 100, e.g., the robot main controller that controls the various robot systems, can be configured to execute one or more measures that makeup a cleaning fluid mitigation strategy.

One cleaning fluid mitigation strategy includes reducing or stopping the cleaning liquid from being applied to the agitator, e.g., brushroll, by controlling the pump 53 that dictates the flow of cleaning fluid from the supply tank 51. For example, the pump 53 may vary the flow rate of the cleaning fluid as the robot 100 approaches the wall 510. That is, as examples, the flow rate can be varied proportionally to the distance from the wall or target speed of the drive system. Another cleaning fluid mitigation strategy includes reducing the speed of or stopping the agitator, e.g., the brushroll 130. The brushroll motor can be controlled to reduce or stop the brushroll from rotating, which allows the brushroll 130 to have less contact with the floor during the same period of time, which results in dispensing less cleaning fluid on the floor and instead the brushroll can retain more cleaning fluid during the period of time while the autonomous floor cleaner is responding to recognizing an obstacle, e.g., while the autonomous floor cleaner is slowing its drive speed. Another cleaning fluid mitigation strategy includes reducing the drive speed of the autonomous floor cleaner. The reduction in drive speed can contribute to the pooling mitigation strategy because it can provide additional exposure to the suction source to vacuum excess fluid from the floor.

Adjustments to two or more of the agitator, pump, drive, or other robot systems can be utilized in combination to provide an effective pooling mitigation strategy. Specific adjustments or proportions for each aspect of a cleaning fluid pooling mitigation strategy can be determined experimentally or via heuristics depending upon the desired cleaning fluid mitigation outcome, e.g., the target drying time or an acceptable average or threshold amount of pooled cleaning fluid.

FIG. 5C shows an autonomous floor cleaner 100 responding to encountering an obstacle, in this depiction a wall 510. While autonomous floor cleaners often include algorithms to avoid obstacles, occasional collisions occur (e.g., because the obstacle wasn't detected or the drive system wasn't able to avoid it) and can be the source of cleaning fluid pooling events. For example, the sudden collision can cause excess cleaning fluid to drop from the dispensing system, e.g., the drip bar 172, or be flung from the agitator outside the range of the squeegee or suction source.

A typical response to an obstacle collision event for an autonomous floor cleaner can be to execute a back-up procedure in order to clear the object, then reassess and determine a new drive path using the navigation system and robot sensors. However, this can cause or exacerbate cleaning fluid pooling issues because while reversing the squeegee 140 cannot reach or interact with cleaning fluid between the squeegee and the obstacle. And, because conventional autonomous wet floor cleaners are typically configured to output a constant flow rate of cleaning fluid and the reverse speed is relatively slow, excess cleaning fluid tends to pool in the pooling pocket 190 in these scenarios.

While a back-up procedure is likely to be central to most obstacle collision recovery algorithms executed by an autonomous floor cleaner, additional adjustments to other robot systems can be executed to aid in cleaning fluid pooling mitigation. For example, in order to prevent or reduce excess liquid from being left on the floor, the robot 100 may perform a cleaning fluid pooling mitigation strategy that includes one or more different aspects. In one cleaning fluid pooling mitigation strategy, the pump 53 is automatically controlled to reduce the flow rate or stop the pumping of the cleaning fluid to the drip bar in response to the collision event. Accordingly, as the robot 100 executes a suitable obstacle collision recovery algorithm, such as transitioning to reverse movement, less or no cleaning fluid will be dispensed. In another aspect, the robot 100 may halt movement for a predetermined period of time to allow excess liquid to be picked up by an agitator, such as brushroll 130, or to be vacuumed by the suction source 46.

In response to an obstacle collision event, the pooling mitigation strategy may include a modified back-up procedure that includes turning off the pump 53, slowing down the rotation of the brushroll 130, and reversing the direction of the robot by controlling the drive system 70. In another aspect, the backup procedure may include turning off the pump 104 and stopping the motion of one or more agitators on the robot. In one aspect, the robot 100 can move at a reduced speed in the backward direction during the backup procedure. In another aspect, the robot 100 can be configured to execute a swivel maneuver to cause the squeegee to strategically overlap the pooling pocket 190 as it backs up, or another maneuver to increase the amount of cleaning fluid recovered. For example, the robot 100 can be configured to move a certain distance to generate a particular amount of overlap or be configured to move to generate a percentage overlap.

FIG. 5D shows an autonomous wet cleaning robot 100 responding to encountering an obstacle, such as a wall 510, or otherwise performing a turn, such as at the end of a corn row drive pattern. An exemplary corn row pattern can include the robot 100 driving forward until it encounters an obstacle and then turning one-hundred and eighty degrees and driving parallel to the previous drive path at a slight offset sufficient to provide floor coverage by driving in a pattern of rows iteratively across the floor surface. When the autonomous wet cleaning robot 100 performs a turn, excess cleaning fluid may be dispensed from the robot, the brushroll 130 may fling cleaning fluid out of range of the squeegee or brushroll, and/or cleaning fluid in the pooling pocket 190 may avoid the squeegee 140, for example due to the angle of the squeegee from the turning maneuver.

As discussed with previous exemplary scenarios, there are a variety of different cleaning fluid pooling mitigation strategies that the autonomous floor cleaner 100 can be configured to execute to prevent or reduce excess cleaning fluid from pooling on the floor. For example, pump 53 can reduce or turn off dispensing of cleaning fluid during the turn, the rotational speed of the brushroll can be slowed or stopped to maintain cleaning solution on the brush during the turn or at least reduce the amount of cleaning solution being dispensed from the brushroll. The cleaning fluid pooling mitigation strategy may include a re-priming sequence periodically to ensure a consistent amount of liquid along the brushroll 130 as described in more detail below with reference to FIG. 6.

FIG. 5E shows an autonomous wet cleaning robot 100 becoming stuck with respect to an obstacle, e.g., a desk 520. In response to determining it has become stuck or having traction issues, the robot can be configured to perform an escape routine. In one aspect, the obstacle 520 may be a coffee table, couch, chair, dining table, desk, or any other piece of furniture the robot 100 can drive underneath where a portion of the robot can become stuck and cannot navigate away from. In one aspect, the obstacle 520 may simply be a location in the cleaning area 500 in which the robot 100 may become stuck and may have to perform an escape routine. The obstacle 520 may be a different floor type than another portion of the cleaning area 500 or may be at a different elevation than another portion of the cleaning area 500 such that the robot 100 may detect a wheel slip or a lack of traction. In response to a stuck event, a robot 100 may dispense excessive liquid in one location compared to the amount of liquid the robot 100 deposits in one location when the robot 100 progresses forward. To prevent excess cleaning fluid from being left on the floor, the robot 100 may perform a variety of mitigation strategies as discussed above. In addition to the other mitigation strategies discussed above, the pump and brushroll can be controlled to prevent or reduce cleaning fluid dispensing during the escape room until the robot recovers from the stuck event and can return to a normal state.

FIG. 5F shows the autonomous wet cleaning robot 100 returning to a docking station 530. This is one example of a unit shutdown or a shutdown sequence. Unit shutdown may occur when the robot 100 finishes cleaning the cleaning area 500, the robot detects a low battery event, or the robot 100 is otherwise commanded to stop or pause. Cleaning fluid can continue to dispense from the drip bar and from the brushroll after the shutdown sequence is initiated, which may result in unwanted pooling. One exemplary pooling mitigation strategy that can be executed in this scenario includes the following sequence. The robot 100 can disable the pump 104, increase the speed of the agitator 130, and continuously run the suction mechanism 152 for a predetermined period. The predetermined period may be short, such as a few seconds. The speed of the brushroll may be increased during the shutdown to remove liquid from the brushroll. Further, the suction source can be controlled to assist in recovering excess liquid from the brushroll, drip bar, or floor surface. After this sequence, the robot 100 can stop the suction source 152 and rotation of the brushroll 130 and begin traveling toward the docking station 530. This can reduce or eliminate a potential trail of cleaning fluid that may otherwise be left by the robot 100 as it returns to the docking station 530. Once the robot 100 is on the docking station 530, the robot 100 may perform a clean-out cycle to attempt flushing the system and drying the agitator 130 using the on-device suction source 152.

Figure 6:
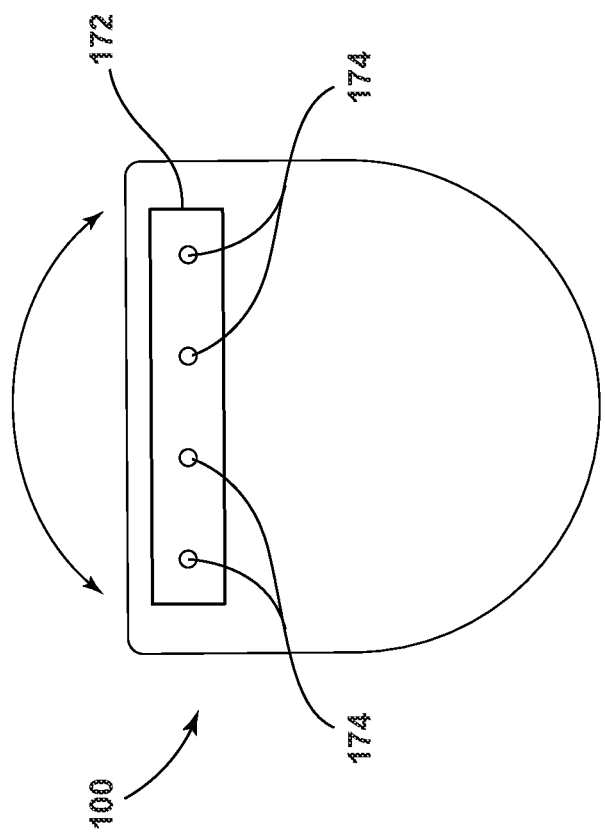
FIG. 6 is a representational view of an autonomous wet cleaning robot start-up routine according to one aspect.

FIG. 6 shows a bottom view of an exemplary autonomous floor cleaner 100. The drip bar 172 includes one or more drip locations 174 above the brushroll 130 (not shown). In an alternate embodiment of the present disclosure, the drip bar 172 can be located in a different position within the robot housing. The drip locations 174 may limit the portions of the brushroll 130 exposed to fluid and may result in the brushroll 130 having an uneven moisture level. During a start-up or a priming routine the autonomous floor cleaner can be configured to wiggle from side to side. That is, the robot 100 can be configured to rotate from side to side to assist in distributing cleaning fluid across the brushroll 130. The robot 100 can also perform the wiggle routine during cleaning to maintain a consistent moisture profile on the agitator 130 during the cleaning run.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. An autonomous wet floor cleaner for wet cleaning an environment, the autonomous wet floor cleaner comprising:
   a navigation system for autonomously localizing and navigating the autonomous wet floor cleaner about an environment;
   a drive system for autonomously driving the autonomous wet floor cleaner according to the navigation system;
   a cleaning fluid dispenser system including a supply tank for cleaning fluid, wherein the cleaning fluid dispenser system is configured to dispense cleaning fluid from the supply tank along a cleaning fluid flow path;
   a recovery system including a recovery tank for recovering dirty fluid and a suction source in fluid communication with the recovery tank, wherein the suction source is configured to recover dirty fluid into the recovery tank;
   a controller configured to control the autonomous wet floor cleaner according to a plurality of autonomous wet floor cleaner instructions stored in memory, wherein the controller is configured to identify a cleaning fluid pooling precursor event by analyzing one or more of the plurality of autonomous wet floor cleaner instructions to predict pooling of cleaning fluid and in response control one or more of the drive system, cleaning fluid dispenser system, and the recovery system to mitigate fluid pooling associated with the identified autonomous wet floor cleaner instruction.

2. The autonomous wet floor cleaner of claim 1, wherein the controller controls a combination of two or more of the drive system, cleaning fluid dispenser system, and the recovery system to mitigate cleaning fluid pooling.

3. The autonomous wet floor cleaner of claim 1, wherein the plurality of autonomous wet floor cleaner instructions include one or more of:
   a turn instruction to turn the autonomous wet floor cleaner at an angle,
   a drive speed reduction instruction,
   a reverse drive instruction,
   an escape routine instruction,
   a shutdown instruction; and
   wherein the controller identifies the one or more autonomous wet floor cleaner instructions being sufficient to cause a cleaning fluid pool to form.

4. The autonomous wet floor cleaner of claim 1, wherein the controller is configured to reduce a cleaning fluid flow rate of the cleaning fluid dispenser system in response to the cleaning fluid pooling precursor event.

5. The autonomous wet floor cleaner of claim 1, wherein the cleaning fluid dispenser system includes a cleaning fluid pump and the controller is configured to at least one of reduce the cleaning fluid pump rate and halt operation of the cleaning fluid pump in response to the cleaning fluid pooling precursor event.

6. The autonomous wet floor cleaner of claim 1, including a variable speed brush roll and wherein the controller is configured to reduce brush roll speed in response to the cleaning fluid pooling precursor event.

7. The autonomous wet floor cleaner of claim 1, wherein the drive system includes a drive motor and the controller is configured to at least one of reduce drive speed of the drive motor and halt operation of the drive motor in response to the cleaning fluid pooling precursor event.

8. The autonomous wet floor cleaner of claim 1 including a suction source, wherein the controller is configured to at least one of activate and increase suction of the suction source in response to the cleaning fluid pooling precursor event.

9. The autonomous wet floor cleaner of claim 1 wherein the controller is configured to initiate a priming sequence for cleaning fluid distribution.

* * * * *